United States Patent [19]

Mathis et al.

[11] 4,447,597

[45] May 8, 1984

[54] METHOD FOR ADJUSTING ARYLENE SULFIDE POLYMER CURE RATES

[75] Inventors: Ronald D. Mathis; Jerry A. Reed, both of Bartlesville, Okla.

[73] Assignee: Phillips Petroleum Company, Bartlesville, Okla.

[21] Appl. No.: 422,787

[22] Filed: Sep. 24, 1982

[51] Int. Cl.³ .............................................. C08G 75/14
[52] U.S. Cl. .................................... 528/388; 528/480; 528/502
[58] Field of Search ........................ 528/480, 502, 388

[56] References Cited

U.S. PATENT DOCUMENTS

| | | | |
|---|---|---|---|
| 3,717,620 | 2/1973 | Rohlfing | 528/373 |
| 3,919,177 | 11/1975 | Campbell | 528/374 |
| 4,247,598 | 1/1981 | Blackwell | 428/419 |
| 4,273,919 | 6/1981 | Feldman et al. | 528/480 |

OTHER PUBLICATIONS

Mead, Encylcopedia of Chemical Process Equipment, pp. 816 to 825, Reinhold Publishing Corp. N.Y., 1965.

*Primary Examiner*—Melvin I. Marquis

[57] ABSTRACT

A method for adjusting the cure rate of a mixture of arylene sulfide polymer particles in which the particles of an arylene sulfide polymer mixture are classified by size groups, the size groups of classified particles are segregated, and at least one size group is removed from the mixture. In a further embodiment at least one size group of classified particles removed from one mixture is added to another mixture of polymer particles. In another embodiment the further use of the segregated size groups of classified particles is based upon a determination of the cure rate of at least one segregated size group of particles.

9 Claims, No Drawings

METHOD FOR ADJUSTING ARYLENE SULFIDE POLYMER CURE RATES

BACKGROUND OF THE INVENTION

This invention relates to improving processing characteristics with aromatic sulfide polymers. In one of its aspects this invention relates to affecting the curing rates of arylene sulfide polymer mixtures. In another of its aspects this invention relates to the classification of arylene sulfide polymer mixtures by particle size. In still another of its aspects this invention relates to the separation and blending of portions of arylene sulfide polymer mixtures that have been classified by size.

In the processing of commercially produced arylene sulfide polymer a problem can occur, particularly when using fiber grade mixtures in that curing during pelletizing or spinning results in detrimental screen pack blinding. It has now been found that there is a gradient in the rate of cure depending upon the size of polymer particle in commercially produced arylene sulfide polymer such that by suitable size exclusion methods particles within certain size ranges of a mixture can be segregated, excluded from the mixture, or reblended with another mixture to provide blends or mixtures having cure rates within the most desirable ranges for certain applications, i.e., relatively lower cure rates for fiber operations or relatively higher cure rates for molding or coating polymer blends.

It is therefore an object of this invention to provide a method for adjusting the cure rate of a mixture of arylene sulfide polymer particles. It is a further object of this invention to provide a method for producing mixtures of arylene sulfide polymer having relatively high or relatively low cure rates as compared to as-produced polymer mixtures. It is another object of this invention to provide mixtures of arylene sulfide polymers having adjusted cure rates. It is still another object of this invention to provide fibers, molded objects, polymeric coatings, and film and plate extrusions of arylene sulfide polymers having adjusted cure rates.

Other aspects, objects and the various advantages of this invention will become apparent to those skilled in the art upon reading this specification and the appended claims.

STATEMENT OF THE INVENTION

In accordance with this invention a method is provided for adjusting the cure rate of a mixture of arylene sulfide polymer particles in which an arylene sulfide polymer mixture is classified by particle size groups, the classified particle size groups are segregated, and at least one size group of classified particles is removed from the mixture.

In a further embodiment of the invention at least one size group of classified particles that had been segregated and removed from an arylene sulfide polymer particle mixture is admixed with another mixture of arylene sulfide particles other than the mixture from which the classified particles were removed thereby forming a second mixture having the cure rate different from the cure rate prior to the admixture of the classified particles.

The basis for the present invention lies in the discovery that smaller particle size arylene sulfide polymer from as-produced polymer mixtures has a significantly lower rate of cure than larger size polymer particles from the same mixture. This knowledge permits the segregation of arylene sulfide particles by known size exclusion methods such as screening, cyclone separation, or density gradient methods, with, if desired, subsequent determination of the rate of cure for any segregated particle size so that certain particle sizes can be used in required amounts to "fine tune" the curing characteristics of mixtures produced by reblending procedures. The determination of the cure rate of various segregated portions of an as-produced mixture should allow for calculating the optimization of any desired cure characteristic for a blend, thereby permitting the "tailoring" of processing parameters of arylene sulfide polymers designed for specific end products.

The term "arylene sulfide polymer" as used in this specification is intended to include polymers of the type which are prepared as described in U.S. Pat. No. 3,354,129, issued Nov. 21, 1967, to Edmonds and Hill. As disclosed in this patent, these polymers can be prepared by reacting a polyhalo-substituted cyclic compound containing unsaturation between adjacent ring atoms and an alkali metal sulfide in a polar organic compound. The resulting polymer contains the cyclic structure of the polyhalo-substituted compound coupled in repeating units through a sulfur atom. The polymers which are preferred for use in this invention, because of their high thermal stability and availability of the materials from which they are prepared, are those polymers having the repeating unit —R—S where R is phenylene, biphenylene, naphthylene, biphenylene ether or a lower alkyl-substituted derivative thereof. By "lower alkyl" is meant alkyl groups having one to six carbon atoms such as methyl, propyl, isobutyl, n-hexyl, and the like. The preparation of such polymers is quite well disclosed in the above patent of Edmonds et al.

The polymers of this invention are preferably those which have melting temperatures above about 150° C. These arylene sulfide polymers can have a melting temperature anywhere in the range from about 150° C. to about 500° C. Polymers of phenylene sulfide normally have melting temperatures in the range from about 230° C. to about 330° C. The preferred polymers have an inherent viscosity in chloronaphthalene at 206° C. at least 0.1, more preferably between 0.1 and 0.5, and ideally between 0.13 and 0.35.

The invention is broadly applicable to polyarylene sulfides formed by any technique. The invention is useful with polymers produced by reacting anhydrous sodium sulfides with polyhalo-substituted cyclic compounds in polar organic solvents as disclosed in U.S. Pat. No. 3,354,129. The invention can be used with branched polymers wherein polyhalo aromatic compounds are added to the polymer to produce branching. The invention is especially useful with linear polymers prepared with a p-dihalobenzene, an alkali metal sulfide, an organic amide, and an alkali metal carboxylate as disclosed in U.S. Pat. No. 3,919,177 and optionally together with an alkali metal hydroxide. Such polymers have a melt flow of at least about 100 and generally within the range of about 200 to about 500 and higher as determined by ASTM D 1238-70 modified to a temperature of 316° C. using a 5 kilogram weight, the value being expressed as grams per 10 minutes.

As indicated above, it has now been found according to the invention that the cure rate can be adjusted for a mixture of arylene sulfide polymer particles by segregating and reblending as-produced polymers such as disclosed and claimed in U.S. Pat. No. 3,919,177. The so-modified polymer mixtures are suitable for use or, as otherwise expressed, can be tailored for suitable uses where either a relatively lower rate of cure or a relatively higher rate of cure than produced in commercially as-produced polymer mixtures.

The following example illustrates that the separation of an as-produced polymer mixture of arylene sulfide produces sized fractions having different cure characteristics.

EXAMPLE I 200 g of Ryton polyphenylene sulfide, Phillips Petroleum Company trademarked arylene sulfide polymer prepared in accordance with U.S. Pat. No. 3,919,177, having a melt flow of 324 grams/10 minutes and made in the form of a powder, was separated into three fractions using No. 20 and No. 60 standard test sieves (wire cloth) having nominal sieve openings of 841 μm and 249 μm respectively. The rate of cure of each of the three fractions and of a non-separated control was determined using Rheometrics Dynamic Spectroscopy. In this test, molten arylene sulfide polymer at 300° C. is subjected to a constant shear of 10 radians/sec for a period of 20 minutes and the storage modulus is measured as a function of time. Since the storage modulus is directly proportional to polymer viscosity, the percentage increase in storage modulus is a comparative measure of the increase in polymer viscosity and consequently a measure of the comparative amount of polymer cure. Data for the three fractions of different particle size polymer and the non-separated control are shown in Table I.

relatively larger size having a relatively faster rate of cure; and (c) removing at least one size group of classified particles wherein the at least one size group removed comprises relatively large particles thereby rendering the cure rate of the remainder of the first mixture relatively slower than before removal of the classified particles.

2. A method for adjusting the cure rate of a first mixture of arylene sulfide polymer particles comprising:
  (a) classifying particles from an uncured arylene sulfide polymer mixture by size groups:
  (b) segregating size groups of classified particles to separate particles of relatively small size having a relatively slower rate of cure from particles of relatively larger size having a relatively faster rate of cure; and
  (c) removing at least one size group of classified particles wherein the at least one size group removed comprises relatively small particles thereby rendering the cure rate of the remainder of the first mixture relatively faster than before removal of the classified particles.

3. A method of claim 1 wherein said classified particles removed are admixed with a second mixture of arylene sulfide particles thereby causing said second mixture to have a cure rate relatively faster than before admixture with said classified particles.

4. A method of claim 2 wherein said classified particles removed are admixed with a second mixture of arylene sulfide particles thereby causing said second

TABLE I

| Mixture Identification | Nominal Particle Size, μm | Recovered Polymer, wt. %[a] | Storage Modulus | | | Percent Increase |
| --- | --- | --- | --- | --- | --- | --- |
| | | | Dynes/cm² - at 20 min | Dynes/cm² = at 6 min | ΔDynes/cm² | |
| Polymer as Produced | Entire Range | — | 5370 | 2440 | 2930 | 120 |
| Course particles | >841 | 8.3 | 5500 | 2340 | 3160 | 135 |
| Intermediate Particles | 249–841 | 37.8 | 5130 | 2200 | 2930 | 133 |
| Fine particles | <249 | 54.0 | 4410 | 2130 | 2280 | 107 |

[a]Approximately 3.4 weight percent of the original 200 g of polymer was not recovered from the sieving operation.

Calculations of the percent increase in storage modulus of the non-separated polymer mixture from the weighted average of the three separated fractions gives a value of 119 percent increase which is in excellent agreement with the observed 120 percent. This indicates the accuracy and reliability of this evaluation method.

We claim:
1. A method for adjusting the cure rate of a first mixture of arylene sulfide polymer particles comprising:
  (a) classifying particles from an uncured arylene sulfide polymer mixture by size groups:
  (b) segregating size groups of classified particles to separate particles of relatively small size having a relatively slower rate of cure from particles of mixture to have a cure rate relatively slower than before admixture with said classified particles.

5. A method of claims 1, 2, 3, or 4 wherein a determination of the cure rate of at least one size group of classified particles is made.

6. A mixture of arylene sulfide polymers produced by the method of claims 1, 2, 3, or 4.

7. A mixture of arylene sulfide polymers produced by the method of claim 6.

8. An article of manufacture produced from a mixture of arylene sulfide polymers of claim 6.

9. An article of manufacture produced from a mixture of arylene sulfide polymers of claim 7.

* * * * *

UNITED STATES PATENT AND TRADEMARK OFFICE
CERTIFICATE OF CORRECTION

PATENT NO. : 4,447,597
DATED : May 8, 1984
INVENTOR(S) : Ronald D. Mathis, Jerry O. Reed It is certified that error appears in the above-identified patent and that said Letters Patent is hereby corrected as shown below:

Column 4, claim 7 should correctly read:

A mixture of arylene sulfide polymers produced by the method of claim 5.

Signed and Sealed this

Twenty-fifth Day of September 1984

[SEAL]

Attest:

GERALD J. MOSSINGHOFF

Attesting Officer

Commissioner of Patents and Trademarks